US012553279B2

(12) United States Patent
Gorgas et al.

(10) Patent No.: US 12,553,279 B2
(45) Date of Patent: Feb. 17, 2026

(54) ADJUSTABLE SEAL FOR SLIDING DOORS AND WINDOWS

(71) Applicant: Allegion Access Technologies LLC, Farmington, CT (US)

(72) Inventors: Paul N. Gorgas, Monroe, CT (US); Aaron Rose, Hamden, CT (US); Christopher E. Kolodziej, Kensington, CT (US); Thuan Van Nguyen, South Windsor, CT (US)

(73) Assignee: Allegion Access Technologies LLC, Farmington, CT (US)

( * ) Notice: Subject to any disclaimer, the term of this patent is extended or adjusted under 35 U.S.C. 154(b) by 0 days.

(21) Appl. No.: 18/791,832

(22) Filed: Aug. 1, 2024

(65) Prior Publication Data

US 2025/0059823 A1 Feb. 20, 2025

Related U.S. Application Data

(60) Provisional application No. 63/520,124, filed on Aug. 17, 2023.

(51) Int. Cl.
*E06B 7/18* (2006.01)
*E06B 3/46* (2006.01)

(52) U.S. Cl.
CPC . *E06B 7/18* (2013.01); *E06B 3/46* (2013.01)

(58) Field of Classification Search
CPC ........ E06B 7/2303; E06B 1/70; E06B 7/2312; E06B 7/23; E06B 7/232; E06B 7/18; E05C 7/005
See application file for complete search history.

(56) References Cited

U.S. PATENT DOCUMENTS

| | | | | |
|---|---|---|---|---|
| 484,235 | A | | 10/1892 | Plunkett |
| 1,633,375 | A | | 6/1927 | Dudley |
| 2,638,190 | A | | 5/1953 | Watkins |
| 3,397,487 | A | | 8/1968 | Hunt et al. |
| 4,164,095 | A | | 8/1979 | Musacchia |
| 4,277,920 | A | * | 7/1981 | Dixon ..................... E04B 2/824 52/64 |

(Continued)

FOREIGN PATENT DOCUMENTS

| | | | |
|---|---|---|---|
| CN | 213928055 U | * | 8/2021 |
| CN | 217538498 U | | 10/2022 |

(Continued)

OTHER PUBLICATIONS

English translation of CN213928055U from WIPO (Year: 2021).*

(Continued)

*Primary Examiner* — Daniel J Troy
*Assistant Examiner* — Susan M. Heschel
(74) *Attorney, Agent, or Firm* — Taft Stettinius & Hollister LLP

(57) ABSTRACT

An adjustable seal is provided for a sliding window panel of a door or window system. The adjustable seal includes first and second elongated seals and at least one elongated brush mounted to an elongated base. The elongated base is adjustably engaged to a lower or bottom side of the sliding window panel to close any gaps between the sliding window panel and the support surface along which the window panel slides.

19 Claims, 8 Drawing Sheets

(56) References Cited

U.S. PATENT DOCUMENTS

| | | | | |
|---|---|---|---|---|
| 4,513,536 | A * | 4/1985 | Giguere | E06B 1/70 49/470 |
| 5,908,064 | A | 6/1999 | Bruce | |
| 6,612,358 | B2 | 9/2003 | Hay et al. | |
| 6,973,753 | B2 | 12/2005 | Liebscher | |
| 7,472,516 | B2 * | 1/2009 | Pepper | E06B 1/70 49/470 |
| 7,992,355 | B2 | 8/2011 | Bridgman et al. | |
| 8,205,387 | B2 | 6/2012 | Ranaudo et al. | |
| 8,443,549 | B2 | 5/2013 | Salvietti | |
| 8,627,604 | B2 | 1/2014 | Seymour et al. | |
| 8,826,598 | B2 | 9/2014 | Ranaudo et al. | |
| 9,458,654 | B2 | 10/2016 | Palsson et al. | |
| 9,637,970 | B1 | 5/2017 | Rendon, Jr. et al. | |
| 9,816,310 | B2 * | 11/2017 | Haynes | E06B 1/16 |
| 9,903,148 | B2 | 2/2018 | Rodems et al. | |
| 10,113,347 | B2 | 10/2018 | Wolfe | |
| RE47,380 | E | 5/2019 | Bridgman et al. | |
| 10,280,678 | B1 | 5/2019 | Rendon, Jr. et al. | |
| 10,513,876 | B2 | 12/2019 | Molloy et al. | |
| 10,577,848 | B2 | 3/2020 | Rodems et al. | |
| 10,718,150 | B2 | 7/2020 | Hall et al. | |
| 10,808,446 | B2 | 10/2020 | Hall et al. | |
| 10,890,016 | B2 | 1/2021 | Brewer | |
| 10,920,477 | B2 | 2/2021 | Akgor et al. | |
| 10,934,772 | B2 * | 3/2021 | Healam | E06B 9/42 |
| 10,995,537 | B2 | 5/2021 | Hall et al. | |
| 10,995,538 | B2 | 5/2021 | Hall et al. | |
| 11,168,508 | B2 | 11/2021 | Dreyer | |
| 11,274,490 | B2 | 3/2022 | Goldfinch et al. | |
| 11,401,735 | B2 | 8/2022 | Schonberger | |
| 11,448,003 | B2 | 9/2022 | Wolfe et al. | |
| 11,492,832 | B2 | 11/2022 | Hernandez | |
| 11,555,344 | B2 | 1/2023 | Patel et al. | |
| 11,713,616 | B2 * | 8/2023 | Wolfe | E06B 3/362 49/31 |
| 11,761,262 | B2 * | 9/2023 | Fleischmann | E06B 7/232 49/470 |
| 2005/0210754 | A1 * | 9/2005 | Ferrell | E06B 7/22 49/468 |
| 2008/0092445 | A1 | 4/2008 | Ramirez | |
| 2012/0117881 | A1 | 5/2012 | Seymour et al. | |
| 2012/0247024 | A1 | 10/2012 | Therrien | |
| 2013/0042534 | A1 | 2/2013 | Polus | |
| 2013/0097935 | A1 | 4/2013 | Sprague | |
| 2019/0309561 | A1 | 10/2019 | Hall et al. | |
| 2021/0032905 | A1 | 2/2021 | Zhang et al. | |
| 2022/0098926 | A1 | 3/2022 | Comaglio | |
| 2022/0136303 | A1 | 5/2022 | Martin et al. | |
| 2022/0235593 | A1 | 7/2022 | Bai | |
| 2023/0061488 | A1 | 3/2023 | Wolfe et al. | |
| 2023/0067739 | A1 | 3/2023 | Patel et al. | |
| 2023/0086262 | A1 | 3/2023 | Erskine et al. | |
| 2023/0088843 | A1 | 3/2023 | Oakes et al. | |
| 2023/0110893 | A1 | 4/2023 | Stabile | |
| 2023/0366268 | A1 * | 11/2023 | Heissenberg | E06B 9/17046 |

FOREIGN PATENT DOCUMENTS

| | | | |
|---|---|---|---|
| CN | 218150514 | U | 12/2022 |
| EP | 2565356 | A1 | 3/2013 |
| WO | 2015018608 | A1 | 2/2015 |

OTHER PUBLICATIONS

International Search Report; United States Patent and Trademark Office; International PCT Application No. PCT/ US2024/042902; Jan. 16, 2025; 2 pages.

Written Opinion of the International Searching Authority; United States Patent and Trademark Office; International PCT Application No. PCT/US2024/042902; Jan. 16, 2025; 4 pages.

* cited by examiner

ADJUSTABLE SEAL FOR SLIDING DOORS AND WINDOWS

CROSS-REFERENCE TO RELATED APPLICATION

The present application claims the benefit of the filing date of U.S. Provisional Application Ser. No. 63/520,124 filed on Aug. 17, 2023, which is incorporated herein by reference in its entirety.

TECHNICAL FIELD

The present disclosure relates to sliding doors and windows, and more particularly to an adjustable seal for sliding doors and windows.

BACKGROUND

Door systems include one or more movable door members in order to facilitate ingress and egress. Some systems include door members that are swing doors that move about a pivot axis. Some door systems include sliding door members or revolving door members. Window systems include one or more movable window members that can be raised or swung about a pivot axis to open and closed.

Sliding door and window systems have one or more sliding doors or sliding windows that move along at least one guide track or support surface between an open position and a closed position. Some sliding door systems have a sliding door that is bifurcated into multiple panels, such as an upper panel that can be decoupled from a lower panel to provide window functionality. The upper window panel typically hangs from an upper track so that all or a portion of the weight of the window panel is supported by the upper track. The lower door panel, in contrast, has all or a portion of its weight support on the guide track located on the floor.

For sliding doors, unevenness of the floor along the threshold can be an issue for operability of sliding door systems, particularly for sliding doors with an upper window panel and a lower door panel that are supported by different structures. For example, floor unevenness can create misalignment between the upper panel and the lower panel. As a result, a gap can be created between the upper panel and the lower panel, even if the lower panel is adjusted to attempt to account for the floor unevenness. Sliding windows that slide along a support surface between open and closed positions should also be sealed when closed. Therefore, further improvements in sliding door and window systems are needed.

SUMMARY

In accordance with one or more embodiments of the present disclosure, a sliding door system is provided with at least one sliding door. The sliding door has a bifurcated configuration with an upper sliding window panel and a lower door panel. An adjustable seal is provided between the upper sliding window panel and the lower door panel to seal any gaps between the upper sliding window panel and the lower door panel.

In accordance with one or more embodiments of the present disclosure, a sliding window system is provided with at least one sliding window panel. The sliding window panel moves along a support surface. An adjustable seal is provided between the sliding window panel and the support surface to seal any gaps between the sliding window panel and the support surface.

In an embodiment, the adjustable seal includes an elongated base adjustably mounted along a lower or bottom longitudinal side of the sliding window panel of a sliding door system or sliding window system. The adjustable seal further includes a first elongated seal mounted along the base, and a second elongated seal mounted along the base in a parallel or substantially parallel relationship to the first elongated seal to provide a dual seal arrangement. The adjustable seal also includes an elongated brush mounted to the base that extends between the first and second elongated seals.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The various advantages of the exemplary embodiments will become apparent to one skilled in the art by reading the following specification and appended claims, and by referencing the following drawings, in which:

DETAILED DESCRIPTION

Figure 1:
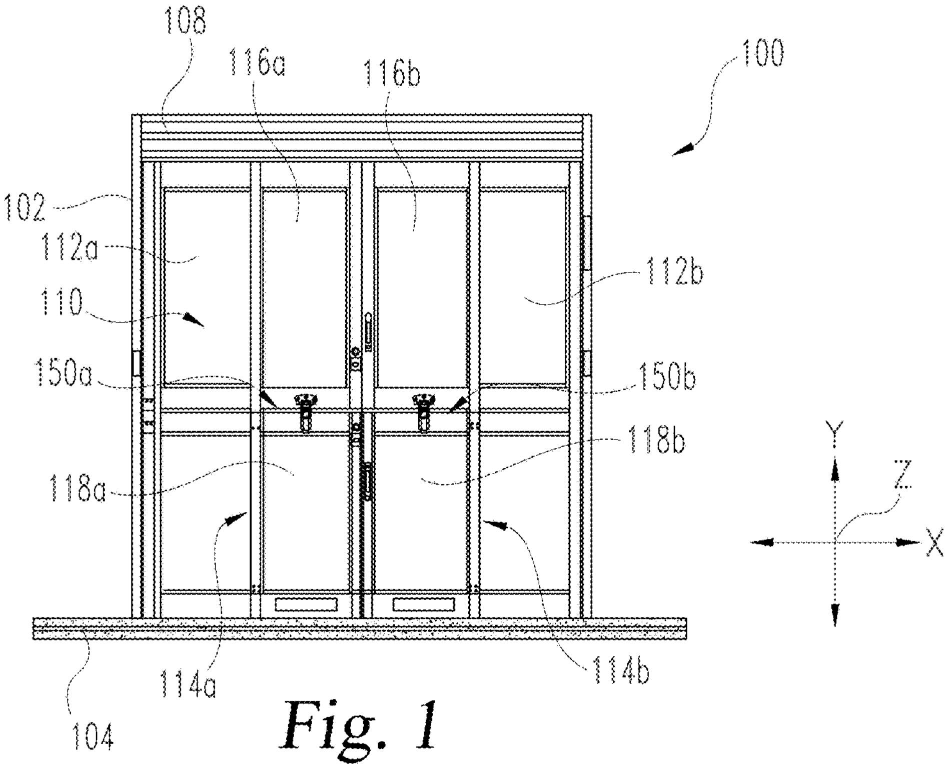
FIG. 1 is an elevation view of a sliding door system from an interior side with sliding doors in a closed condition and adjustable seals, in accordance with one or more embodiments of the present disclosure.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. The directions defined by each axis may be referred to as positive and negative directions, wherein the arrow of the axis indicates the positive direction. In the coordinate system illustrated in FIG. 1 the X-axis defines first and second lateral directions (horizontal in the FIG. 1 orientation), the Y-axis defines first and second longitudinal directions (vertical in the FIG. 1 orientation), and the Z-axis defines first and second transverse directions (into and out of the page in the FIG. 1 orientation.)

Additionally, the descriptions that follow may refer to the directions defined by the axes with specific reference to the orientations illustrated in the Figures. For example, the longitudinal directions may be referred to as "distal" ($X^+$) and "proximal" ($X^-$). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Turning to the figures, in which FIG. 1 illustrates a sliding door system 100, in accordance with one or more embodiments. In the illustrated embodiment, the sliding door system 100 has a structural configuration that combines the functionality of a window with a sliding door, such as disclosed in US Patent Application Pub. No. 2023/0067739, which is incorporated herein by reference. However, embodiments in which a sliding window is employed without door functionality are also contemplated and not precluded by the present disclosure.

In accordance with one or more embodiments, the sliding door system 100 is configured for mounting at a frame 102 in an opening to a building or other enclosure. In accordance with one or more embodiments, an example sliding door system 100 includes a door panel assembly 110 operable for lateral movement along the X-axis with respect to frame 102 via a guide track 106 mounted to floor 104 and via a header 108 mounted to the building structure. Header 108 may include a rail, pulley, track, or other structure from which all or a portion of the weight of door panel assembly 110 is supported. In addition, all or a portion of the weight of door panel assembly may be supported in guide track 106. The sliding door system 100 may have a power source and sensors for automatic movement, and/or may be manually moved for opening and closing.

Figure 2:
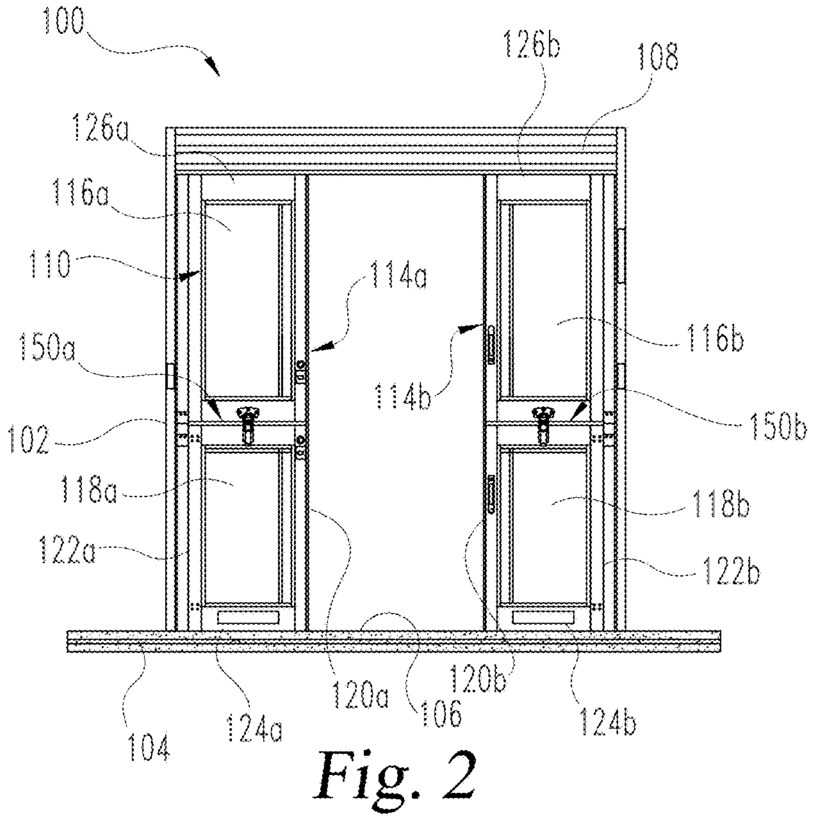
FIG. 2 is an elevation view of the sliding door system of FIG. 1 with sliding doors in an open condition.
Figure 3:
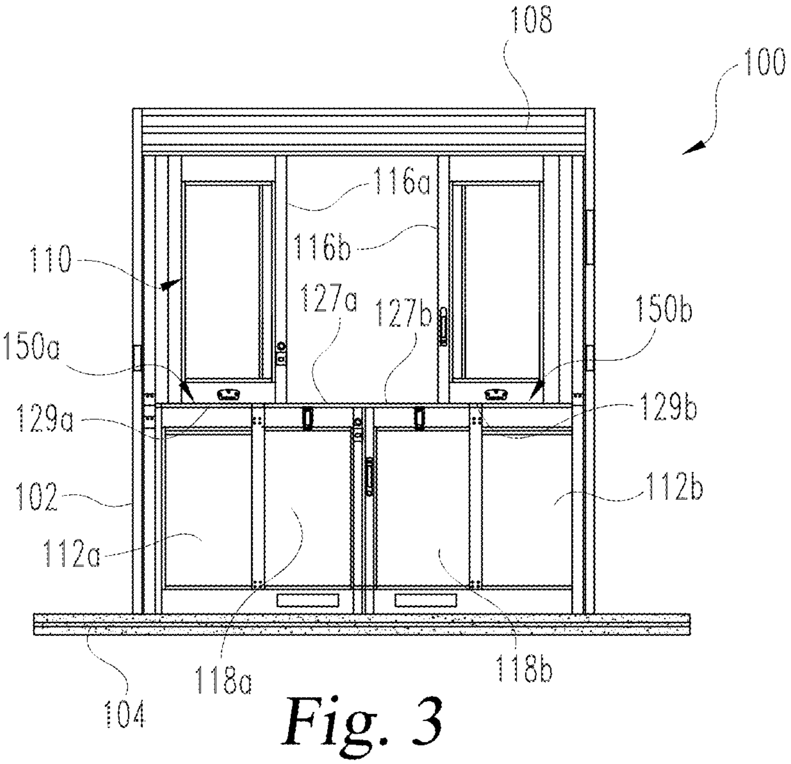
FIG. 3 is an elevation view of the sliding door system of FIG. 1 with upper sliding window panels of the sliding doors in an open condition and lower door panels of the sliding doors in a closed condition during operation of the sliding door system in a window mode.

As illustrated in FIGS. 1-3, the door panel assembly 110 is configured for mounting at the frame 102, which defines a doorway opening. In the illustrated embodiment, the door panel assembly 110 has a vertically or longitudinally bifurcated structural configuration (along the Y-axis) that includes at two stationary panels or sidelights **112*a*, 112*b* and two sliding doors 114*a*, 114*b*. Sliding doors 114*a*, 114*b* are operable for movement in a lateral direction (along the X-axis) between a closed position to at least partially cover the doorway opening and an open position to at least partially expose the doorway opening. In the illustrated embodiments, two sliding doors 114*a*, 114*b* are shown, but embodiments with only one sliding door panel and/or only one stationary panel 112*a*, 112*b***, or no stationary panels, are also contemplated.

In the illustrated embodiment, each sliding door **114*a*, 114*b* has a lateral or horizontally bifurcated structural configuration (along the X-axis) that includes an upper sliding window panel 116*a*, 116*b* and a lower door panel 118*a*, 118*b* that are split horizontally for independent movement relative to one another. However, as discussed above, embodiments in which one or more sliding window panels 116*a*, 116*b* are provided as sliding windows in a sliding window system without a door panel assembly 110** are also contemplated.

An adjustable seal 150*a*, 150*b* is provided along the lower or bottom end of each sliding window panel 116*a*, 116*b*.

The upper sliding window panel 116*a*, 116*b* is releasably attached to the lower door panel 118*a*, 118*b* in a manner that facilitates selective placement of the sliding door 114*a*, 114*b* between a window operating mode and a door operating mode to permit ingress and egress of a user through the doorway opening. In the door operating mode, the sliding window panel 116*a*, 116*b* and the lower door panel 118*a*, 118*b* are attached to each other, the attachment being released to place the upper sliding window panel 116*a*, 116*b* in the window operating mode.

In the illustrated embodiment, each sliding door 114*a*, 114*b* includes a first lateral side 120*a*, 120*b* and an opposite second lateral side 122*a*, 122*b*, respectively, as shown in FIG. 2. Lateral sides 120*a*, 122*a* of sliding door 114*a* extend in a longitudinal direction along the Y-axis between a first longitudinal side 124*a* and a second longitudinal side 126*a*. Lateral sides 120*b*, 122*b* of sliding door 114*b* extend in a longitudinal direction along the Y-axis between a first longitudinal side 124*b* and a second longitudinal side 126*b*. Longitudinal sides 124*a*, 126*a* and longitudinal sides 124*b*, 126*b* extend in a lateral direction along the X-axis.

In addition, for bifurcated door panels 114*a*, 114*b*, the lower door panels 118*a*, 118*b* include upper longitudinal sides 127*a*, 127*b* along which provide a support surface along which the lower or bottom longitudinal sides 129*a*, 129*b* of window panels 116*a*, 116*b* move. In other embodiments, the longitudinal sides 127*a*, 127*b* are a window sill that provide a support surface for the bottom longitudinal sides 129*a*, 129*b* of one or more sliding window panels 116*a*, 116*b* employed in a sliding window system. In either embodiment, the sliding window panels 116*a*, 116*b* each include an adjustable seal 150*a*, 150*b*, respectively, the sealingly engages the support surface along longitudinal sides 127*a*, 127*b*.

Figure 4:
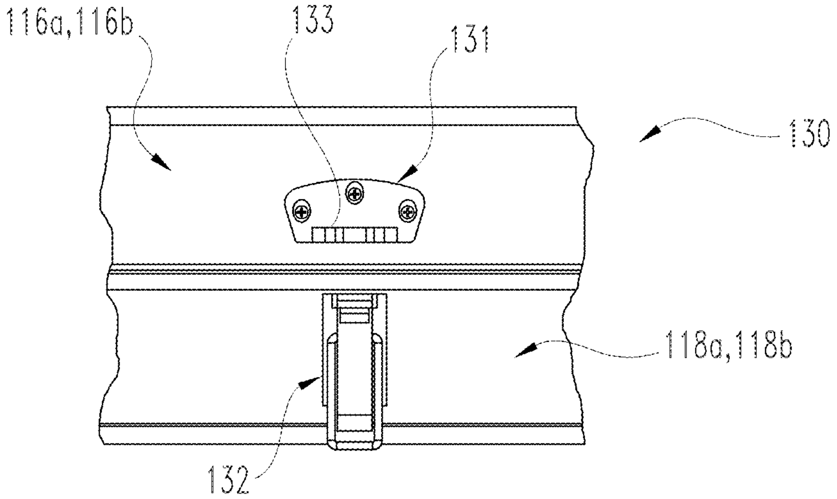
FIG. 4 is a plan view of an embodiment of a coupling mechanism in an unsecure position to decouple the lower door panel from the upper sliding window panel for operation of the sliding door system of FIG. 1 in the window mode.
Figure 5:
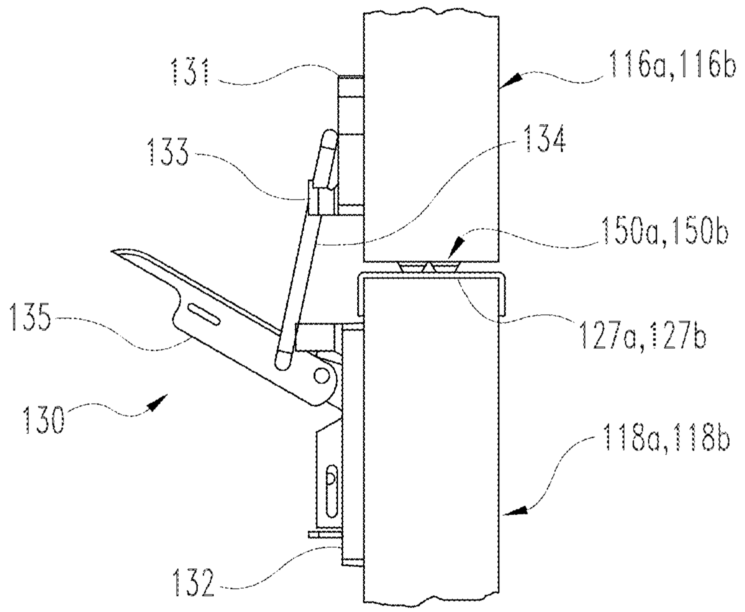
FIG. 5 is an elevation view of the coupling mechanism of FIG. 4 being positioned to couple the lower door panel to the upper sliding window panel for operation in the door mode.

As illustrated in FIGS. 4 and 5, the sliding window panel 116*a*, 116*b* and associated lower door panel 118*a*, 118*b* can be releasably coupled to one another with one or more clamp assemblies 130 that are operable to releasably interlock the upper sliding window panel 116*a*, 116*b* and corresponding the lower door panel 118*a*, 118*b*. One or more clamp assemblies 130 can be used to facilitate the selective placement of the sliding door 114*a*, 114*b* between the window operating mode and the door operating mode. Other embodiments contemplate other structures for securing the window and door panels to one another. Of course, in embodiments in which there is no lower door panel 118*a*, 118*b*, clamp assembly 130 can be omitted.

In accordance with the illustrated embodiment, the clamp assembly 130 includes an upper clamp body 131 and a lower clamp body 132 that provide a visual aid to the user to visually determine when the clamp assembly 130 is engaged or disengaged. The upper clamp body 131 is arranged as a receiver on the upper sliding window panel 116*a*, 116*b*, whereas the lower clamp body 132 is arranged on the lower door panel 118*a*, 118*b*.

The upper clamp body 131 has one or more protrusions 133 that include grooves or other structure to receive a clamp member 134. The lower clamp body 132 has a pivotally-attached clamp member 134, such as a hook, that is pivotably moveable via a handle 135 between a clamped position to place the clamp assembly 130 in a locked operating state, and an unclamped position to place the clamp assembly 130 in an unlocked state. In the clamped position, a user may pivot the clamp member 134 for engagement with the upper clamp member 131 and engagement with protrusion 133. In the unclamped position, the clamp member 134 is counter-pivoted for disengagement with the upper clamp member 131 and movement out disengagement with protrusion 133.

The structural configuration of the clamp assembly 130 facilitates self-centering of the upper sliding window panel 116*a*, 116*b* and the lower sliding door panel 118*a*, 118*b*. Such self-centering serves to align the upper sliding window panel member 11*a*, 116*b* and corresponding lower door panel 118*a*, 118*b* when placed from the window operating mode to the door operating mode. In addition, engagement of the clamp assembly 130 can draw the upper window panel 116*a*, 116*b* toward the corresponding lower door panel 118*a*, 118*b*, pressing adjustable seal 150*a*, 150*b* against the support surface along the longitudinal side 127*a*, 127*b*.

In the door operating mode, a user may place the clamp assembly 130 in the clamped or locked operating state by selectively manipulating the handle 135 to facilitate engagement of the clamp member 134 to the one or more protrusions 133. Such engagement interlocks the upper sliding window panel 116*a*, 116*b* and the corresponding lower sliding door panel 118*a*, 118*b*. In that way, the upper sliding window panel 116*a*, 116*b* and corresponding lower sliding door panel 118*a*, 118*b* may move jointly.

In the window operating mode, a user may place the clamp assembly 130 in the unclamped or unlocked operating state by selectively manipulating the handle 135 to facilitate disengagement of the clamp member 134 and the one or more protrusions 133. Such disengagement releases the attachment of the upper sliding window panel 116*a*, 116*b* and the corresponding lower sliding door panel 118*a*, 118*b*. As a result, in the window operating mode, the entire weight of the sliding door panels 118*a*, 118*b* is supported on guide track 106.

Figure 6:
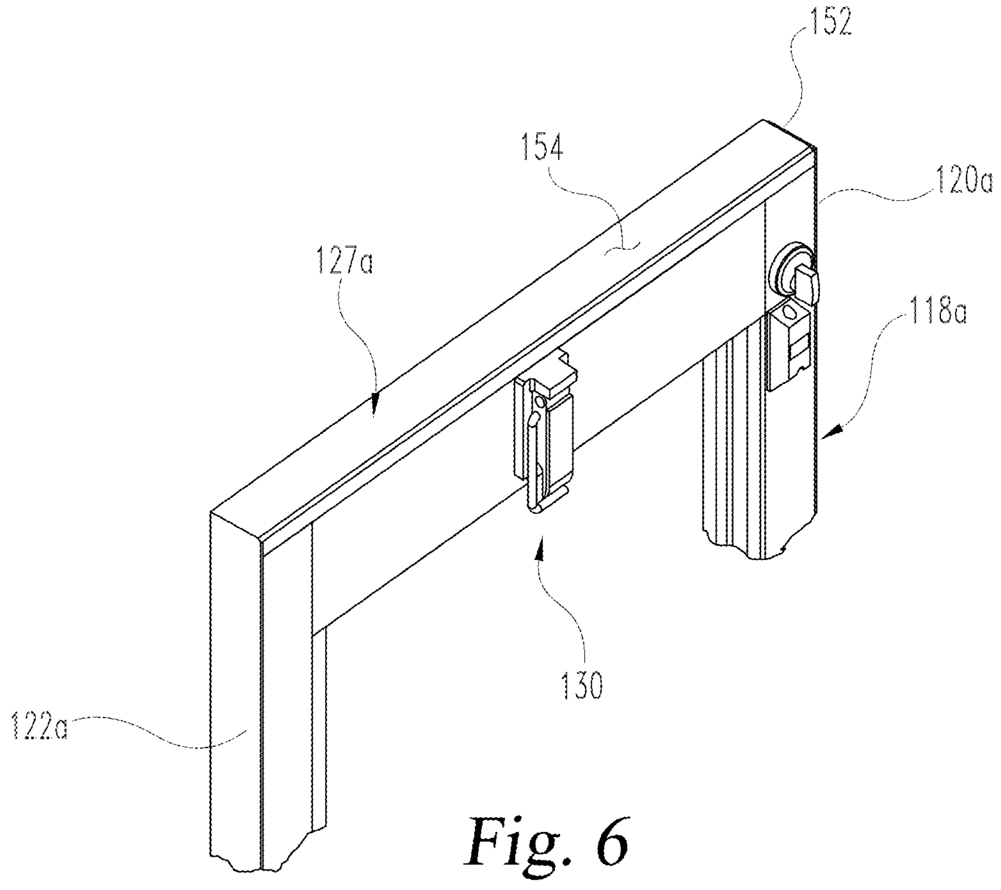
FIG. 6 is a perspective view of a support surface of the lower door panel against which the adjustable seal on the upper sliding window panel is positioned.
Figure 7:
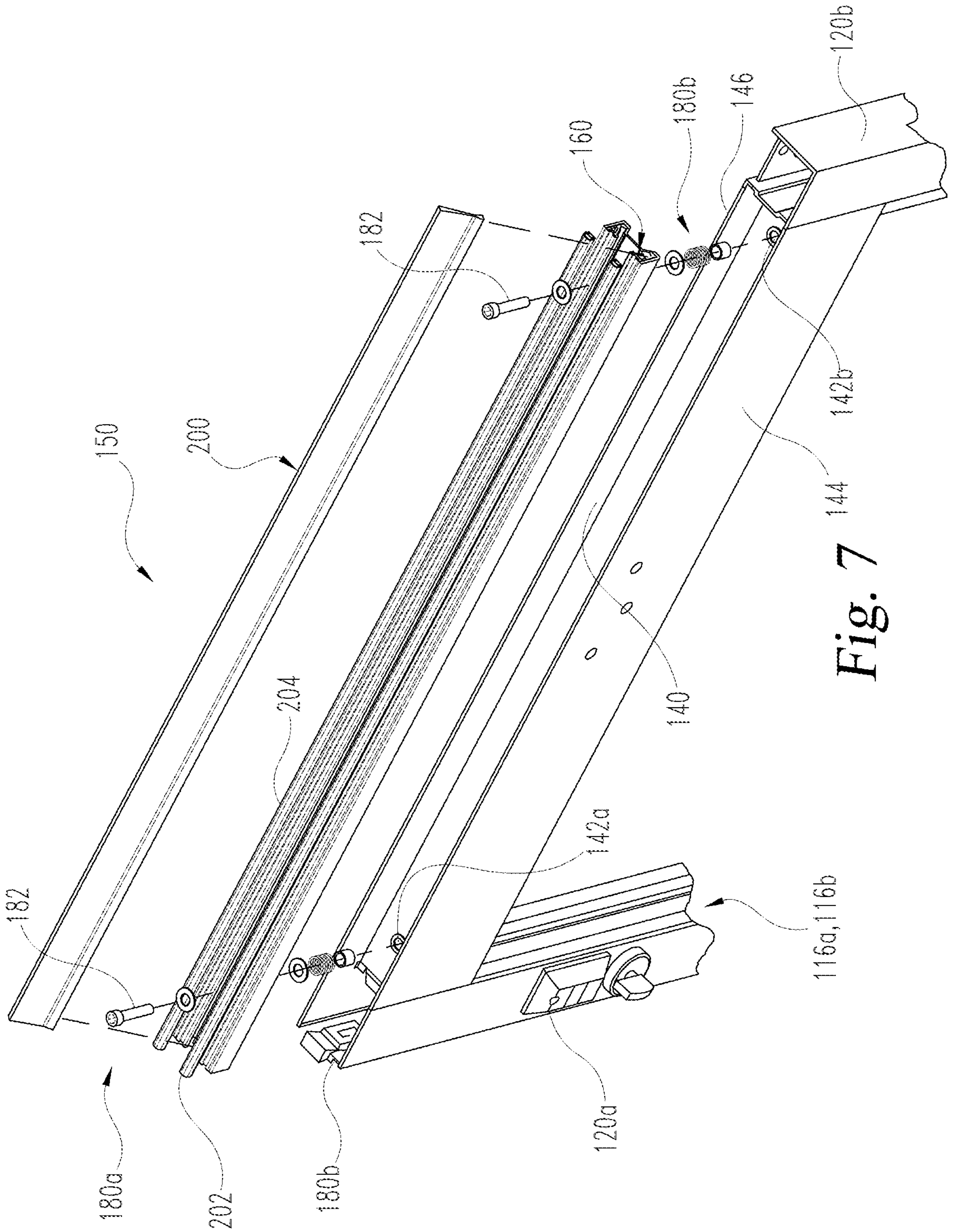
FIG. 7 is an exploded perspective view of an embodiment of the adjustable seal and a portion of the upper sliding window panel for a sliding door system, such as shown in FIG. 1, or a sliding window system.
Figure 8:
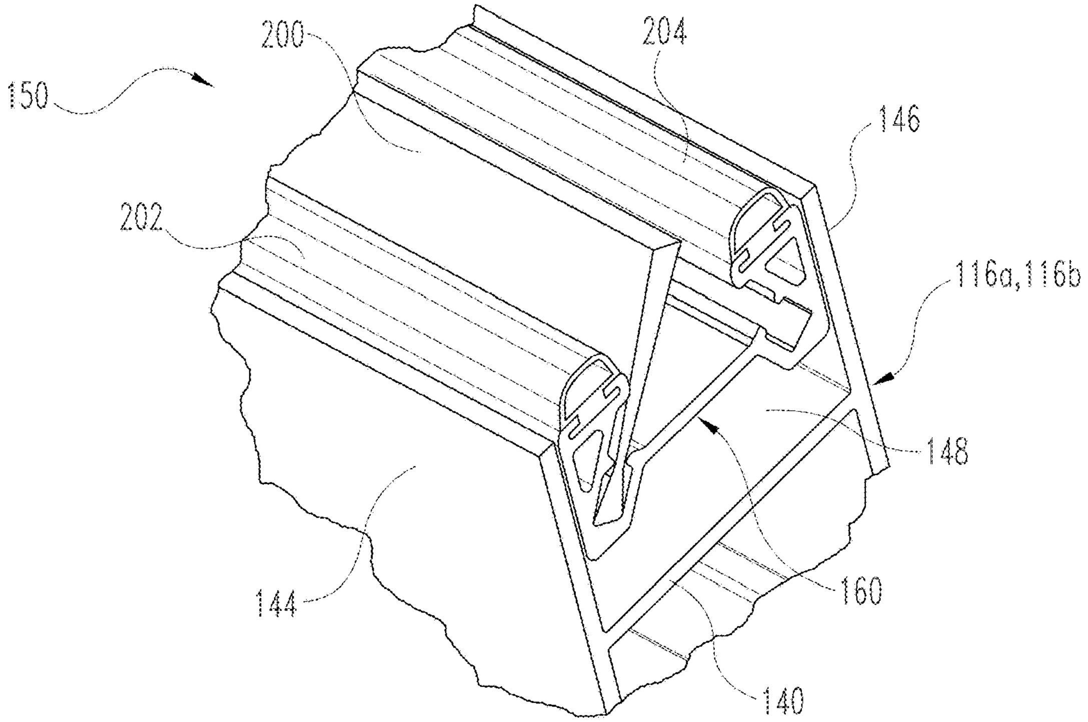
FIG. 8 is an enlarged perspective view of an end portion of the adjustable seal and the sliding window panel of FIG. 7.
Figure 9:
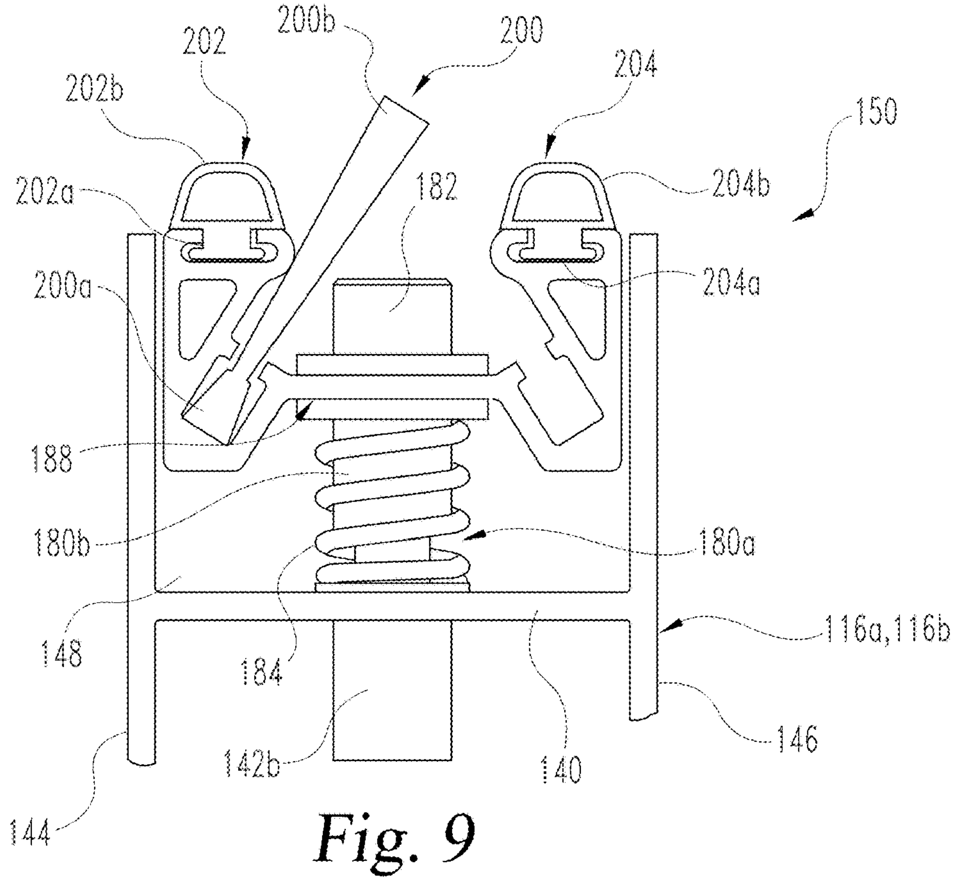
FIG. 9 is an enlarged end view of the adjustable seal and the sliding window panel of FIG. 7.
Figure 10:
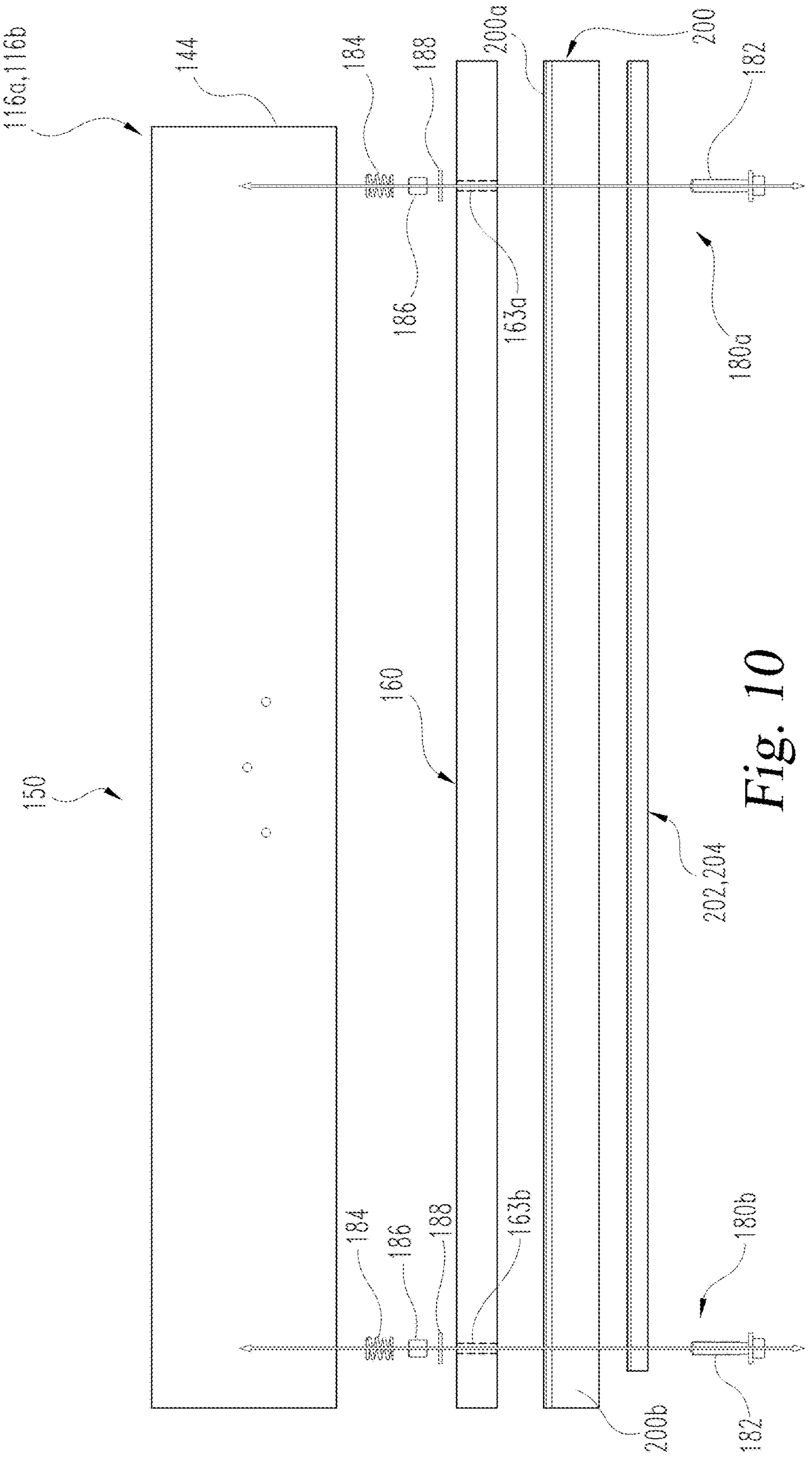
FIG. 10 is an exploded elevation view of the adjustable seal and the sliding window panel of FIG. 7.
Figure 11:
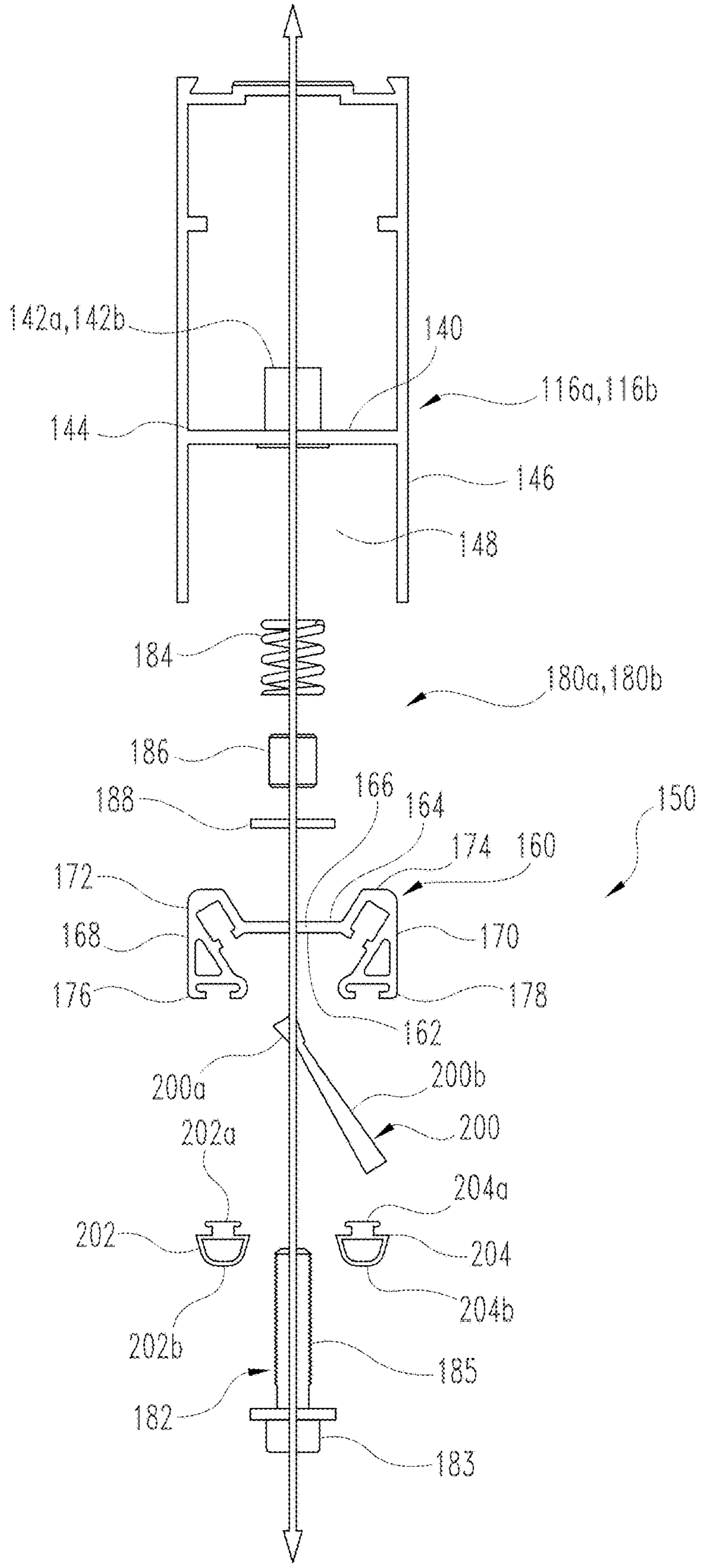
FIG. 11 is an exploded end view of the adjustable seal and the sliding window panel of FIG. 7.
Figure 12:
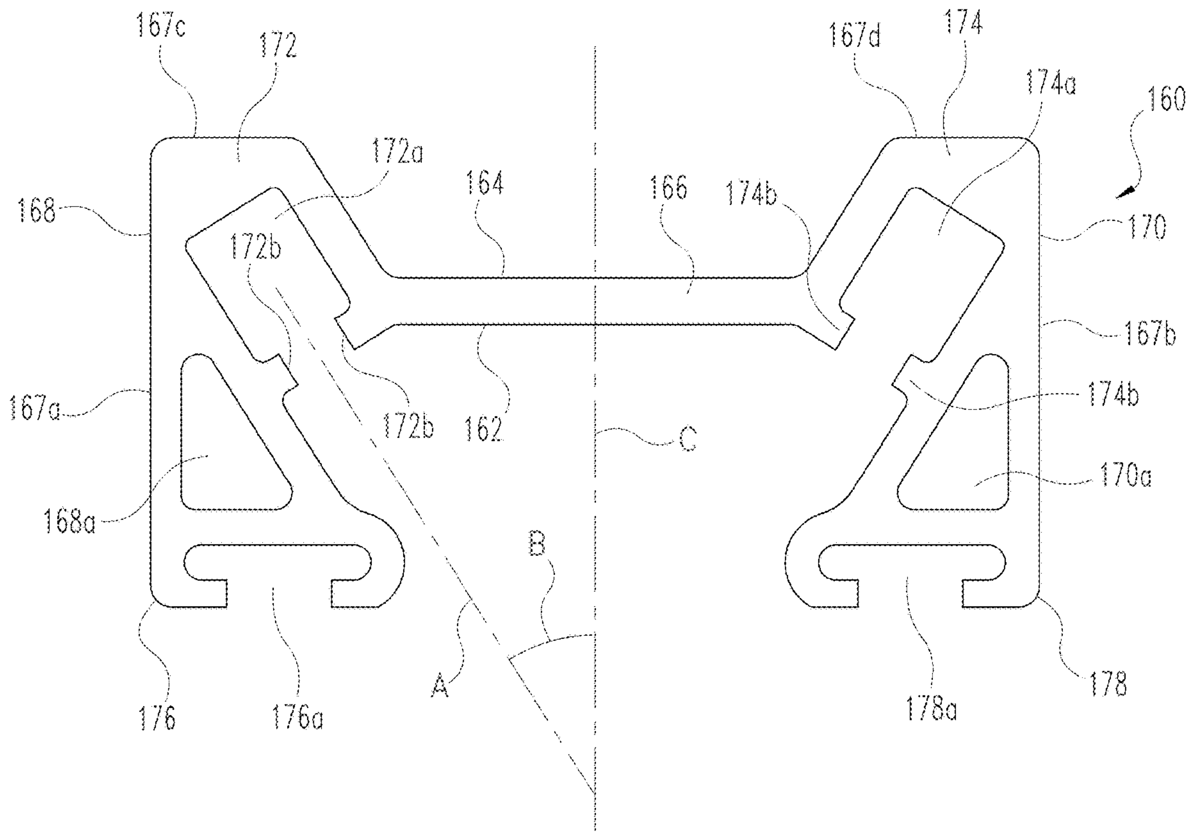
FIG. 12 is an end view of a base for the adjustable seal of FIG. 7.

Referring to FIG. 6, lower door panel 118*a* is partially shown along with longitudinal side 127*a*, it being understood that door panel 118*b* can be similarly configured. In the illustrated embodiment, longitudinal side 127*a* includes a flat, channel or plate-like member 152 that extends along longitudinal side 127*a* from first lateral side 120*a* to second lateral side 122*a*. In an embodiment, adjustable seal 150*a* is positioned in sealing engagement with the flat upper support surface 154 of member 152. In an embodiment, the flat upper support surface 154 is formed along a window sill rather than along a lower door panel.

Further details of an embodiment of adjustable seal 150*a*, 150*b* (collectively and individually also referred to herein as adjustable seal 150) is provided in FIGS. 7-12. Adjustable seal 150 can be adjustable engaged along a bottom or lower side of a sliding window, such as upper sliding window panel 116*a*, 116 of sliding door system 110, or along a sliding window panel 116*a*, 116*b* of a sliding window system.

Adjustable seal 150 includes an elongated base 160 that is mounted to the bottom longitudinal sides 129*a*, 129*b* of sliding window panel 116*a*, 116*b* with a pair of adjustable fastener assemblies 180*a*, 180*b*. Base 160 is configured to secure first and second elongated seals 202, 204 along base 160 in a parallel or substantially parallel relationship. In an embodiment, each of the elongated seals 202, 204 is a bulb seal with a hollow body and a semi-circular or semi-oval cross-sectional shape.

Base 160 is also configured to secure at least one elongated brush 200 along base 160 so that brush 200 extends from base 160 and between seals 202, 204. The elongated base 160, elongated brush 200, and elongated seals 202, 204 are each elongated in the laterally extending X-axis direction.

Each fastener assembly 180*a*, 180*b* includes an elongated fastener 182 with a head 183 positionable against a bottom facing side 162 of base 160, and a stem 185 that extends through a corresponding hole 163*a*, 163*b* in center portion 166 of base 160. Each fastener assembly 180*a*, 180*b* also includes a spring 184, a spring guide 186 positionable in spring 184, and a washer 188 positionable between spring guide and an upper facing side 164 of base 160. Stem 185 is threadingly engaged to a web 140 of window panel 116*a*, 116*b*, with spring 184 being clamped between web 140 and upper facing side 164 of base 160.

In an embodiment, web 140 includes a pair of elongated, internally threaded collars 142*a*, 142*b* extending therefrom adjacent each of the lateral sides 120*a*, 122*a* of sliding window panel 116*a*, 116*b* to provide a range of locations along which stem 185 of fastener 182 of each fastener assembly 180*a*, 180*b* can be threadingly engaged. In an embodiment, web 140 extends between and connects a first wall 144 and a second wall 146 of sliding window panel 116*a*, 116*b*. In an embodiment, first wall 144 and second wall 146 extend downwardly from web 140 to form a cavity 148 at the bottom of window panel 116*a*, 116*b* in which the adjustable seal 150 is positioned.

Base 160 includes a plate-like center portion 166 connecting first and second mounting portions 168, 170 at opposite ends of center portion 166. Base 160 is symmetrical about a center axis C that extends longitudinally in the direction of the Y-axis when adjustable seal 150 is mounted to the sliding window panel 116*a*, 116*b*. Mounting portions 168, 170 each include a pocket 172, 174 configured to receive and retain brush 200 therein. Each mounting portion 168, 170 also includes a rail 176, 178 configured to receive and retain respective ones of the elongated seals 202, 204.

Each rail 176, 178 forms a groove 176*a*, 178*a* that slidably receives a stem 202*a*, 204*a* of the elongated seals 202, 204. Stems 202*a*, 204*a* can be configured to dovetail with grooves 176*a*, 176*b* to secure elongated seals 202, 204 on base 160. Bulb portions 202*b*, 204*b* of each elongated seal 202, 204 are located outside of groove 176*a*, 178*a* in order to contact the flat upper surface 154 of member 152 along door panel 118*a*, 118*b* or along a sill.

Each pocket 172, 174 forms a receptacle 172*a*, 174*a* that is configured to receive an engagement portion 200*a* of brush 200. The symmetrical arrangement of pockets 172, 174 allows brush 200 to be positioned in either pocket 172, 174 and extend toward center axis C and between elongated seals 202, 204. When engaged in the selected pocket 172, 174, bristles 200*b* of brush 200 extend from engagement portion 200*a* and outwardly from pocket 172, 174 in between elongated seals 202, 204. In an embodiment, bristles 200*b* cross center axis C. Each pocket 172, 174 may also include opposing inwardly projecting flanges 172*b*, 174*b* to contact engagement portion 200*a* and assist in retaining brush 200 therein. Engagement portion 200*a* may include a handle, covering, or other structure to which bristles 200*b* are mounted and is securable in pocket 172 or pocket 174 with the associate flanges 172*b*, 174*b*.

In an embodiment, base 160 includes opposite lateral surfaces 167*a*, 167*b* on the outer facing sides of mounting portions 168, 170. Lateral surfaces 167*a*, 167*b* extend parallel to center axis C along the length of base 160. In addition, base 160 includes upper sides 167*c*, 167*d* that extend along pockets 172, 174 of mounting portions 168, 170. Upper sides 167*c*, 167*b* are located above center portion 166, and lateral sides 167*a*, 167*b* extend downwardly from respective ones of the uppers sides 167*c*, 167*d* along the adjacent pocket 172, 174 to rail 176, 178 below center portion 166. Rails 176, 178 extend parallel to center portion 166 and parallel to each other below center portion 166.

Mounting portion 168 includes a triangular void 168*a* between pocket 172 and rail 176, and mounting portion 170 includes a triangular void 170*a* between pocket 174 and rail 178. Voids 168*a*, 170*a* reduce material within base 160 and allow flexing of the of the mounting portions 168, 170. In addition, the plate-like profile of center portion 166 and single attachment location for mounting portions 168, 170 to center portion 166 allows mounting portions 168, 170 to flex relative to center portion 166 and enhance sealing engagement by the elongated seals 202, 204 against the support surface 154.

Each of the pockets 172, 174 and its associated receptacle 172*a*, 174*a* is oriented to extend along an axis A that is obliquely oriented to center axis C. In one embodiment, axis A is angled at an angle B ranging from 15 degrees to 50 degrees with respect to center axis C in order to provide clearance along center portion 166 for the fastener assemblies 180*a*, 180*b* while orienting brush 200 into the space between elongated seals 202, 204. In an embodiment, angle B ranges from 25 degrees to 40 degrees in order to provide the clearance. In an embodiment, angle B ranges from 30 degrees to 35 degrees in order to provide the clearance. In an embodiment, angle B is about 32 degrees in order to provide the clearance.

Fastener assemblies 180*a*, 180*b* adjust the spacing between web 140 and base 160 at each of the lateral sides 120*a*, 122*a* of sliding window panel 116*a* and/or lateral sides 120*b*, 122*b* of sliding window panel 116*b*. As a result, fastener assemblies 180*a*, 180*b* can be individually adjusted by raising or lowering base 160 to close the gap between the bottom of window panels 116*a*, 116*b* and longitudinal sides 127*a*, 127*b* of door panels 118*a*, 118*b* or support surface 154. Individual adjustment at each end of adjustable seal 150 allows the base 160 and elongated seals 202, 204 to close a gap that isn't a constant width between the window panel 116*a*, 116*b* and door panel 118*a*, 118*b*, or between window panel 116*a*, 116*b* and support surface 154.

Various aspects of the present disclosure are contemplated. According to one aspect, a system includes a sliding window panel configured to slide along a support surface between an open position and a closed position, and an adjustable seal engaged to a bottom side of the sliding window panel facing the support surface. The adjustable seal includes an elongated base, first and second elongated seals mounted to the base and spaced apart from one another along the base, and an elongated brush mounted to the base that extends through the space between the elongated seals. The adjustable seal also includes first and second fastener assemblies for engaging respective opposite ends of the elongated base to the sliding window panel. The first and second fastener assemblies each include a fastener extending through the elongated base to engage the sliding window panel and a spring between the base and the window panel. The spring of each fastener assembly is adjustable with the fastener to position the respective opposite end of the base relative to the bottom of the sliding window panel so the first and second seals are each positioned against the support surface at each of the opposite ends of the elongated base.

In an embodiment, the elongated base includes a first mounting portion including a first pocket and a first rail extending along the base, a second mounting portion including a second pocket and a second rail extending along the base, and a center portion extending along the base that connects the first mounting portion to the second mounting portion. The first seal mounted to the first rail and the second seal mounted to the second rail.

In a further embodiment, the brush includes an engagement portion and bristles extending from the mounting portion, each of the first and second pockets includes a receptacle configured to receive the engagement portion of the brush, and the engagement portion of the brush is positioned in the receptacle of one of the first and second pockets.

In a further embodiment, the first and second mounting portions are movable relative to one another by flexing about the center portion to bias the first and second seals against the support surface.

In a further embodiment, the center portion includes a first hole adjacent one of the opposite ends of the base and a second hole adjacent the other of the opposite ends of the base. The fasteners of the first and second fastener assemblies are positioned through respective ones of the first and second holes and engaged to the sliding window panel.

In yet a further embodiment, the sliding window panel includes a first wall and a second wall spaced from the first wall, and a web that extends between and connects the first and second walls. The web includes first and second internally threaded collars that extend from the web. The fasteners of the first and second fastener assemblies are threadingly engaged to respective ones of the first and second collars.

In yet a further embodiment, the first wall and the second wall each extend from the web to the bottom of the sliding window panel. The first and second walls and the web form a cavity along the bottom of the sliding window panel. The adjustable seal is positioned at least partially within the cavity.

In an embodiment, the system includes a lower door panel and the support surface is provided along an upper side of the lower door panel.

In a further embodiment 9, the sliding window panel is coupled to the lower door panel to operate the sliding window panel and lower door panel together in a door mode, and the sliding window panel is released from the lower door panel to operate independently of the lower door panel a window mode.

According to another aspect of the present disclosure, an adjustable seal for a sliding window panel is provided. The adjustable seal includes an elongated base including a center portion. The center portion extends between and connects a first mounting and a second mounting portion of the base. The first mounting portion includes a first pocket and a first rail extending along the base, and the second mounting portion including a second pocket and a second rail extending along the base. The adjustable seal also includes a first elongated seal engaged to the first rail, a second elongated seal engaged to the second rail, and a brush engaged to one of the first pocket and the second pocket. The brush extends between the first seal and the second seal.

In an embodiment, each of the first rail and the second rail includes a groove extending therealong, and each of the first elongated seal and the second elongated seal includes a stem that is received in a corresponding groove of the first and second rails.

In a further embodiment, the stems of the first and second elongated seals are dovetailed in the corresponding groove of the first and second rails.

In a further embodiment, the first pocket and the second pocket each include a receptacle, and the brush includes an engagement portion engaged to the base in the one of the first pocket and the second pocket. The brush includes bristles extending from the engagement portion in between the first and second elongated seals.

In yet a further embodiment, each of the first and second pockets includes opposite inwardly projecting flanges extending into the receptacle thereof. The flanges engage the engagement portion of the brush to retain the brush in the one of the first pocket and the second pocket.

In an embodiment, each of the first and second mounting portions is capable of flexing relative to the center portion.

In an embodiment, each of the first and second pockets extends along an axis that is obliquely oriented to a center axis that bisects the center portion of the base.

In a further embodiment, each of the first and second rails extends parallel to the center portion of the base and is positioned below the first pocket or the second pocket of the corresponding first and second mounting portion.

In a further embodiment the center portion of the base includes a bottom side that faces toward the first and second elongated seals and an opposite upper facing side. The first and second pockets project above the upper facing side of the center portion.

In an embodiment, the adjustable seal includes a first fastener assembly and a second fastener assembly for engaging opposite ends of the base to the sliding window. Each of the first and second fastener assemblies includes a fastener positionable through a corresponding hole in the base and a spring around the fastener that extends between the base and the sliding window panel.

In a further embodiment, each of the fastener assemblies includes a washer positionable against the base and a spring retainer around the fastener that is positioned between the fastener and the spring.

While the invention has been illustrated and described in detail in the drawings and foregoing description, the same is to be considered as illustrative and not restrictive in character, it being understood that only the illustrated embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:

a sliding window panel configured to slide along a support surface between an open position and a closed position;

an adjustable seal engaged to a bottom side of the sliding window panel facing the support surface, wherein the adjustable seal includes:

an elongated base, first and second elongated seals mounted to the base and spaced apart from one another along the base, and an elongated brush mounted to the base that extends outwardly from the base through the space that is between the elongated seals, wherein the elongated base includes:

a first mounting portion including a first pocket and a first rail extending along the base, the first seal mounted to the first rail;

a second mounting portion including a second pocket and a second rail extending along the base, the second seal mounted to the second rail; and a center portion extending along the base that connects the first mounting portion to the second mounting portion, wherein the first and second mounting portions are movable relative to one another by flexing about the center portion to bias the first and second seals against the support surface;

first and second fastener assemblies for engaging respective opposite ends of the elongated base to the sliding window panel, the first and second fastener assemblies each including:

a fastener extending through the elongated base to engage the sliding window panel; and a spring between the base and the window panel; and wherein the spring of each fastener assembly is adjustable with the fastener to position the respective opposite end of the base relative to the bottom of the sliding window panel so the first and second seals are each positioned against the support surface at each of the opposite ends of the elongated base.

2. The system of claim 1, wherein:

the brush includes an engagement portion and bristles extending from the engagement portion;

each of the first and second pockets includes a receptacle configured to receive the engagement portion of the brush; and the engagement portion of the brush is positioned in the receptacle of one of the first and second pockets.

3. The system of claim 1, wherein:

the center portion includes a first hole adjacent one of the opposite ends of the base, and a second hole adjacent the other of the opposite ends of the base; and the fasteners of the first and second fastener assemblies are positioned through respective ones of the first and second holes and engaged to the sliding window panel.

4. The system of claim 3, wherein the sliding window panel includes:

a first wall and a second wall spaced from the first wall;

a web that extends between and connects the first and second walls, the web including first and second internally threaded collars that extend from the web; and wherein the fasteners of the first and second fastener assemblies are threadingly engaged to respective ones of the first and second collars.

5. The system of claim 1, further comprising a lower door panel, and wherein the support surface is provided along an upper side of the lower door panel.

6. The system of claim 5, wherein:

the sliding window panel is coupled to the lower door panel to operate the sliding window panel and the lower door panel together in a door mode; and the sliding window panel is released from the lower door panel to operate independently of the lower door panel in a window mode.

7. A system comprising:

a sliding window panel configured to slide along a support surface between an open position and a closed position, wherein the sliding window panel includes a first wall and a second wall spaced from the first wall and a web that extends between and connects the first and second walls, the web including first and second internally threaded collars that extend from the web, wherein the first wall and the second wall each extend from the web to a bottom of the sliding window panel, and wherein the first and second walls and the web form a cavity along the bottom of the sliding window panel; and an adjustable seal positioned at least partially within the cavity and engaged to a bottom side of the sliding window panel facing the support surface, wherein the adjustable seal includes:

an elongated base extending between opposite ends, first and second elongated seals mounted to the base and spaced apart from one another along the base, and an elongated brush mounted to the base that extends outwardly from the base through the space that is between the elongated seals, wherein the elongated base includes:

a first mounting portion including a first pocket and a first rail extending along the base, the first seal mounted to the first rail;

a second mounting portion including a second pocket and a second rail extending along the base, the second seal mounted to the second rail; and a center portion extending along the base that connects the first mounting portion to the second mounting portion, the center portion including a first hole adjacent one of the opposite ends of the base and a second hole adjacent the other of the opposite ends of the base;

first and second fastener assemblies for engaging respective opposite ends of the elongated base to the sliding window panel, the first and second fastener assemblies each including:

a fastener extending through the elongated base to engage the sliding window panel;

a spring between the base and the window panel; and wherein the spring of each fastener assembly is adjustable with the fastener to position the respective opposite end of the base relative to the bottom of the sliding window panel so the first and second seals are each positioned against the support surface at each of the opposite ends of the elongated base, wherein the fasteners of the first and second fastener assemblies are positioned through respective ones of the first and second holes and engaged to the sliding window panel, and wherein the fasteners of the first and second fastener assemblies are threadingly engaged to respective ones of the first and second collars.

8. An adjustable seal for a sliding window panel, the adjustable seal comprising:

an elongated base including a center portion, the center portion extending between and connecting a first mounting and a second mounting portion of the base, the first mounting portion including a first pocket and a first rail extending along the base, and the second mounting portion including a second pocket and a second rail extending along the base, wherein each of the first and second pockets extends along an axis that is obliquely oriented to a center axis that bisects the center portion of the base, and wherein each of the first and second rails extends parallel to the center portion of the base and is positioned below the first pocket or the second pocket of the corresponding first and second mounting portion;

a first elongated seal engaged to the first rail;

a second elongated seal engaged to the second rail; and a brush engaged to one of the first pocket and the second pocket, the brush extending from the one of the first pocket and the second pocket and through a space in between the first seal and the second seal, wherein the center portion of the base includes a bottom side that faces toward the first and second elongated seals and an opposite upper facing side, and wherein the first and second pockets project above the upper facing side of the center portion.

9. The system of claim 1, wherein the first and second mounting portions are movable relative to one another by flexing about the center portion to bias the first and second seals against the support surface.

10. The adjustable seal of claim 8, wherein:

each of the first rail and the second rail includes a groove extending therealong; and each of the first elongated seal and the second elongated seal includes a stem that is received in a corresponding groove of the first and second rails.

11. The adjustable seal of claim 10, wherein:

the stems of the first and second elongated seals are slidingly received in the corresponding groove of the first and second rails.

12. The adjustable seal of claim 10, wherein:

the first pocket and the second pocket each include a receptacle; and the brush includes an engagement portion engaged to the base in the one of the first pocket and the second pocket, the brush including bristles extending from the engagement portion in between the first and second elongated seals.

13. The adjustable seal of claim 12, wherein each of the first and second pockets includes opposite inwardly projecting flanges extending into the receptacle thereof, the flanges engaging the engagement portion of the brush to retain the brush in the one of the first pocket and the second pocket.

14. The adjustable seal of claim 8, further comprising a first fastener assembly and a second fastener assembly for engaging opposite ends of the base to the sliding window, each of the first and second fastener assemblies including a fastener positionable through a corresponding hole in the base and a spring around the fastener that is configured to extend between the base and the sliding window panel.

15. The adjustable seal of claim 14, wherein each of the fastener assemblies includes a washer positionable against the base and a spring retainer around the fastener that is positioned between the fastener and the spring.

16. An adjustable seal for a sliding window panel, the adjustable seal comprising:

an elongated base including a center portion, the center portion extending between and connecting a first mounting and a second mounting portion of the base, the first mounting portion including a first pocket and a first rail extending along the base, and the second mounting portion including a second pocket and a second rail extending along the base;

a first elongated seal engaged to the first rail;

a second elongated seal engaged to the second rail; and a brush engaged to one of the first pocket and the second pocket, the brush extending between the first seal and the second seal, and wherein each of the first and second mounting portions is capable of flexing relative to the center portion.

17. The adjustable seal of claim 16, wherein each of the first and second pockets extends along an axis that is obliquely oriented to a center axis that bisects the center portion of the base.

18. The adjustable seal of claim 17, wherein each of the first and second rails extends parallel to the center portion of the base and is positioned below the first pocket or the second pocket of the corresponding first and second mounting portions.

19. The adjustable seal of claim 18, wherein the center portion of the base includes a bottom side that faces toward the first and second elongated seals and an opposite upper facing side, and wherein the first and second pockets project above the upper facing side of the center portion.

* * * * *